United States Patent [19]
Tenhover

[11] Patent Number: 5,626,943
[45] Date of Patent: May 6, 1997

[54] ULTRA-SMOOTH CERAMIC SUBSTRATES AND MAGNETIC DATA STORAGE MEDIA PREPARED THEREFROM

[75] Inventor: Michael A. Tenhover, East Amherst, N.Y.

[73] Assignee: The Carborundum Company, Worcester, Mass.

[21] Appl. No.: 253,002

[22] Filed: Jun. 2, 1994

[51] Int. Cl.$^6$ .................. G11B 5/66; B32B 3/10
[52] U.S. Cl. .................. 428/141; 428/325; 428/328; 428/331; 428/367; 428/408; 428/409; 428/699; 428/704; 428/694 T; 428/694 TS; 428/694 TR; 428/694 ST; 428/694 SG; 428/900; 427/130; 427/131; 427/128
[58] Field of Search .................. 428/694 T, 694 TS, 428/694 TR, 694 ST, 694 SG, 141, 900, 325, 328, 331, 367, 408, 409, 699, 704; 427/130, 128, 131

[56] References Cited

U.S. PATENT DOCUMENTS

| | | | |
|---|---|---|---|
| 3,681,225 | 8/1972 | Genma et al. | 205/167 |
| 3,716,759 | 2/1973 | Scace et al. | 361/704 |
| 4,069,360 | 1/1978 | Yanagisawa et al. | 428/623 |
| 4,179,299 | 12/1979 | Coppola et al. | 501/90 |
| 4,312,954 | 1/1982 | Coppola et al. | 501/90 |
| 4,376,963 | 3/1983 | Knoop et al. | 360/135 |
| 4,387,080 | 6/1983 | Hatta et al. | 423/345 |
| 4,528,212 | 7/1985 | Cairns et al. | 427/96 |
| 4,554,201 | 11/1985 | Andreev et al. | 428/215 |
| 4,598,017 | 7/1986 | Bayer | 478/336 |
| 4,614,689 | 9/1986 | Ikeda et al. | 428/409 |
| 4,659,611 | 4/1987 | Iwase et al. | 428/209 |
| 4,660,114 | 4/1987 | Yamakawa et al. | 360/122 |
| 4,696,703 | 9/1987 | Henderson et al. | 148/403 |
| 4,701,226 | 10/1987 | Henderson et al. | 148/403 |
| 4,761,345 | 8/1988 | Sato et al. | 428/552 |
| 4,770,953 | 9/1988 | Horiguchi et al. | 428/698 |
| 4,840,844 | 6/1989 | Futamoto et al. | 428/336 |
| 4,851,296 | 7/1989 | Tenhover et al. | 428/457 |
| 4,859,638 | 8/1989 | Wade et al. | 501/88 |
| 5,165,981 | 11/1992 | Yamakawa et al. | 428/141 |
| 5,302,561 | 4/1994 | Ezis | 501/89 |

FOREIGN PATENT DOCUMENTS 60-229224  11/1985  Japan.

OTHER PUBLICATIONS

D. Rose, "Stetching for 10 Gigabits Offers New Opportunities", *Electronic Materials Reports*, Nov., 1993, pp. 2–6.
J. Bond, "The Incredible Shrinking Disk Drive", *Solid State Technology*, Sep. 1993, pp. 39–45.
R. Nass, "Hard–Disk Drives Pack More Data Into Less Space", *Electronic Design*, May 3, 1993, pp. 73–83.
Tenhover, M.A. "Ultra–Smooth Substrates Based on Aluminum Nitride Ceramics and Magnetic Data Storage Media Prepared Therefrom".
Annacone, et al. "An Amorphous (deleted) Layer Overlying a Rigid Disc Substrate and Method for Making the Same".
Annacone, et al. "A Rigid Disc Substrate Comprising a Central Hard Core Substrate with a Hard, Thermally and Mechanically Matched Overlying Smoothing Layer and Method for Making the Same".

*Primary Examiner*—Leszek Kiliman
*Attorney, Agent, or Firm*—Richard L. Hansen; Thomas M. DiMauro

[57] ABSTRACT

Layered substrates are disclosed having an ultra-smooth surface finish thereon rendering them useful in making high density magnetic storage media. The layered substrates are comprised of a non-oxide ceramic core coated with a smoothing layer comprised of an amorphous metal, particularly certain amorphous metal alloys based on chromium, molybdenum, tungsten, and mixtures thereof. Also disclosed are magnetic storage media comprising the layered substrates, as well as processes for making the substrates and magnetic media.

50 Claims, 1 Drawing Sheet

ULTRA-SMOOTH CERAMIC SUBSTRATES AND MAGNETIC DATA STORAGE MEDIA PREPARED THEREFROM

FIELD OF THE INVENTION

This invention concerns substrates suitable for use in media for magnetic data storage, such as a computer hard disk, as well as media which comprise such substrates. The invention also concerns processes for making the substrates and media.

BACKGROUND OF THE INVENTION

Computers widely used today are capable of storing and rapidly manipulating large amounts of data. Typically, such data is stored on some type of magnetic recording medium consisting of a thin magnetic film supported by a substrate. A relatively simple example of such media are magnetic tapes wherein the magnetic film is placed on a flexible polymer film.

The introduction of small computers in recent years for individual users, the so-called "personal computer" or "PC", has generated a need for other types of magnetic data storage needs. Such computers can employ a so-called "floppy disk" for data storage where the magnetic film is placed on a small circular disk substrate that is somewhat rigid, but still flexible. Typically, these computers also employ, as an important component thereof, a so-called "hard disk" drive wherein a relatively large amount of data can be stored on one or more magnetic disks, each of which comprise a magnetic film supported by a rigid, non-flexible disk substrate.

Research efforts have recently focused on improving magnetic data storage technology by trying to reduce the size of the hard disk (to decrease computer size) and, at the same time, attempting to increase the amount of data that can be stored on the disk. Information stored on a magnetic medium is read by the computer using a recording (read-write) head or a read-only head which can "float", i.e., pass, directly over the surface of the magnetic medium and thereby "read" information stored magnetically thereon. Information stored on the medium is measured in terms of bits of data per unit area, typically referred to as areal density. Factors which affect areal density are the thickness, coercivity, magnetic axis orientation, and crystalline texture of the magnetic film, as well as the height at which the recording head floats over the medium. In general, it is advantageous to have the head float as close as possible to the surface of the medium and at a constant height, preferably as low as about 50 Angstroms (Å), since this helps maximize useful storage density.

Substrates conventionally used in hard disk storage media have been based on an aluminum or aluminum-alloy core which is coated with a thin electrodeposited nickel-phosphorous (NiP) layer and finally a thin magnetic metal film, typically of a cobalt-chromium alloy. An example of such storage media is described in U.S. Pat. No. 4,069,360. While such substrates have been successfully used in the past, they are limited in the amount of information that can be stored thereon due to characteristics of the aluminum-NiP substrate.

For example, one problem with such conventional substrates concerns a tendency for aluminum-based disks to deform, i.e., warp, when subjected to the high temperatures necessary to form a suitable magnetic film on the disk. The NiP coating also has a relatively low melting point which similarly impairs the flatness of the intermediate substrate when it is heated in subsequent processing steps. Due to these problems, manufacturing processes presently used to make media based on an aluminum-NiP substrate yield a significant number of defective products that cannot be sold commercially and are typically discarded. The high rejection rate appreciably adds to the cost for such products.

Aluminum and aluminum alloys can be relatively soft materials and, therefore, the surface of these substrates is susceptible to damage during subsequent processing steps and also from improper handling. Further, due to the crystal structure of aluminum, it is difficult to obtain a smooth, mirror-like finish and thereby minimize surface irregularities thereon, which can be thought of simplistically as "peaks" or "valleys". Aluminum or aluminum alloys also can, following high temperature exposure, form intermetallic inclusions which further roughen the surface. These surface irregularities are undesirable, since the magnetic film deposited on the substrate is typically on the order of only about a few hundred angstroms (Å) thick or less and, therefore, any underlying substrate surface irregularities may adversely effect the magnetic axis orientation and texture of the overlying magnetic layer.

The above-described problems with conventional aluminum-based substrates all interfere with the need to have the head float as close as possible to the disk surface. If the surface is uneven due to warpage, or alternatively, has a significant amount of surface peaks and valleys, then the substrate will have a high average surface roughness (Ra). Since the head floats at a height related to this average surface roughness, these problems can limit the amount of information which can be written onto and read from the substrate.

Due to these limitations with conventional aluminum-based substrates, a number of materials have been recently proposed as replacements, such as glass, glass-coated alumina, carbon, silicon nitride and silicon carbide. Glass suffers from a similar strength and rigidity problem, since it tends to also deform when exposed to high temperature. Silicon nitride and silicon carbide have much better strength, toughness, and chemical resistance, especially at high temperatures, but are inherently porous to some extent and therefore, by themselves, have an undesirable surface roughness associated with them. Carbon is disadvantageous due to its porosity, low elastic modulus, and difficulties involved with bonding thin layers of materials on the surface thereof.

Others have previously attempted to employ silicon carbide as a substrate for magnetic storage disks. Japanese patent publication JP 60-229224 discloses a magnetic disc substrate consisting of silicon carbide which is coated with a thin sputtered film of $Al_2O_3$, $SiO_2$ and/or $Si_3N_4$. While the inventors of this substrate purport to provide a poreless and strainless coating on the silicon carbide, these coatings are brittle and of relatively low strength. It is believed that such substrates are susceptible to undesirable chipping and surface damage from handling during manufacture and use. Also, such films are relatively non-conductive and, therefore, tend to build up static electricity during use which is generally undesirable for electronic devices, such as computers.

U.S. Pat. No. 4,598,017 discloses a composite magnetic disk which incorporates a reaction-bonded, silicon carbide substrate. The silicon carbide substrate is initially treated in a siliciding step wherein silicon is said to be deposited into pores on the surface of the silicon carbide and eventually a silicon layer is formed. Thereafter, the surface of the silicon is polished to a final surface roughness of 25 nm (250 Å) Ra, and if this is not possible, the siliciding and polishing steps are repeated. A magnetic layer is formed on the silicon and the substrate is thereafter bonded to an annular, polymeric core.

While the inventors of this composite disk purport to improve the surface finish of reaction-bonded silicon carbide, a surface roughness of 25 nm Ra is not sufficiently smooth to allow use of the low head heights and extremely thin magnetic layers necessary for the high density data storage needs presently of interest to industry. Furthermore, the silicon layer deposited is also inherently brittle and, thus, it is believed to be susceptible to undesirable chipping during manufacture and use. The silicon layer is also relatively non-conductive and subject to the static electricity problem previously mentioned.

As a result, it is desirable to develop a substrate which has good strength, high thermal conductivity, chemical attack resistance, toughness, electrical conductivity, and relatively low coefficient of thermal expansion under conditions in which magnetic media are subjected to during manufacture and use. It would also be desirable for such a substrate to be capable of being polished to a very fine surface finish. Such a substrate material could then be used to produce a magnetic storage medium which allows a recording or read-only head to float at a very low head height so as to maximize areal density.

SUMMARY OF THE INVENTION

The above-described objects and advantages are attained according to the invention described hereinafter. In one aspect, the invention provides a layered substrate capable of being adapted for use as a magnetic data storage medium. The layered substrate comprises:

a non-oxide ceramic core; and a smoothing layer with an inner surface contacting at least one surface of the ceramic core and an outer surface having a surface roughness of about 100 Å Ra or less, preferably less than about 25 Å Ra, and more preferably less than about 10 Å Ra. The smoothing layer comprises a nonmagnetic, substantially amorphous metal having a fracture toughness of at least about 10 MPa·m$^{1/2}$; an electrical resistivity of less than about 200 µΩ·cm; a crystallization temperature of at least about 400° C.; and a coefficient of thermal expansion of between about 2 to about 7 ppm/°C.

In a preferred embodiment, the smoothing layer is comprised of a non-magnetic, substantially amorphous metal alloy corresponding to the formula:

$$M^1_a M^2_b X_c$$

wherein:

$M^1$ is selected from the group consisting of chromium, molybdenum, tungsten, and mixtures thereof;

$M^2$ is selected from the group consisting of titanium, zirconium, hafnium, tantalum, vanadium, niobium, iron, cobalt, nickel, ruthenium, rhodium, paladium, osmium, iridium, platinum, and mixtures thereof;

X is selected from the group consisting of nitrogen, aluminum, boron, silicon, phosphorous, germanium, arsenic, antimony, carbon, tin, and mixtures thereof;

a is from about 0.5 to about 0.95;

b is from 0 to about 0.3; and c is from greater than 0 to about 0.3.

Another aspect of the invention is a magnetic storage medium comprising:

a non-oxide ceramic core;

a magnetic layer capable of storing data and having an inner surface and an outer surface; and a smoothing layer with an inner surface contacting at least one surface of the ceramic core and an outer surface having a surface roughness of about 100 Å Ra or less, preferably less than about 25 Å Ra, and more preferably less than about 10 Å Ra. The smoothing layer is disposed between the ceramic core and the magnetic layer and comprises the non-magnetic, substantially amorphous metals employed in the layered substrate previously described. The metal, in preferred embodiments, is comprised of the metal alloys corresponding to the formula recited hereinabove.

In another aspect, the invention provides a process for making the layered substrate. The process comprises the steps of:

providing a non-oxide ceramic core having a density of at least about 90% of theoretical density;

coating at least one surface of the ceramic core with a smoothing layer comprised of a non-magnetic, substantially amorphous metal having a fracture toughness of at least about 10 MPa·m$^{1/2}$; an electrical resistivity of less than about 200 µΩ·cm; a crystallization temperature of at least about 400° C.; and a coefficient of thermal expansion of between about 2 to about 7 ppm/°C.; and polishing the smoothing layer to a surface roughness of less than about 100 Å Ra.

In another aspect, the invention concerns a process for preparing a magnetic storage medium. The process comprises the steps of:

providing a non-oxide ceramic core having a density of at least about 90% of theoretical density;

coating at least one surface of the ceramic core with a smoothing layer comprised of a non-magnetic, substantially amorphous metal having a fracture toughness of at least about 10 MPa·m$^{1/2}$; an electrical resistivity of less than about 200 µΩ·cm; a crystallization temperature of at least about 400° C.; and a coefficient of thermal expansion of between about 2 to about 7 ppm/°C.;

polishing the smoothing layer to a surface roughness of less than about 100 Å Ra; and coating the smoothing layer with a magnetic layer comprised of a material capable of magnetically storing data thereon.

In the above-described processes, the amorphous metal preferably comprises the metal alloys corresponding to the formula recited hereinabove.

BRIEF DESCRIPTION OF THE INVENTION

DETAILED DESCRIPTION OF THE INVENTION

Figure 1A:
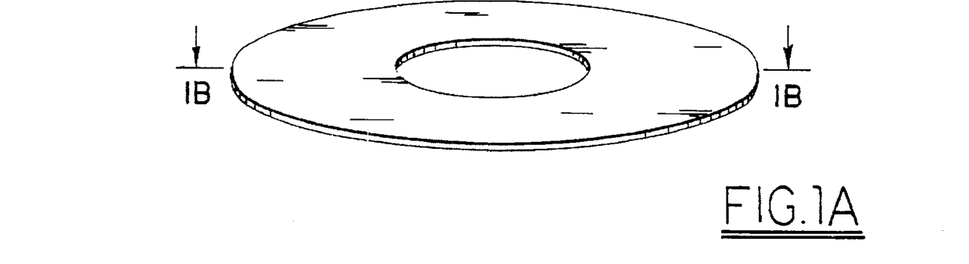
FIG. 1A is a perspective view of an embodiment of a magnetic storage medium in the shape of a flat, annular disk.
Figure 1B:
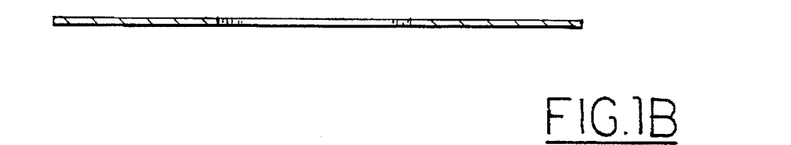
FIG. 1B is a cross-sectional view of the disk shown in FIG. 1A.

The layered substrate may take any shape which is capable of being adapted for use in making a magnetic storage medium. Generally, magnetic storage media currently being manufactured by industry are in the shape of a flat, annular disk as illustrated generally by FIGS. 1A and B herein. However, the layered substrate, as well as a magnetic storage medium comprising the substrate, may also be in the form of a plate, hollow drum, or cylinder.

Figure 2:
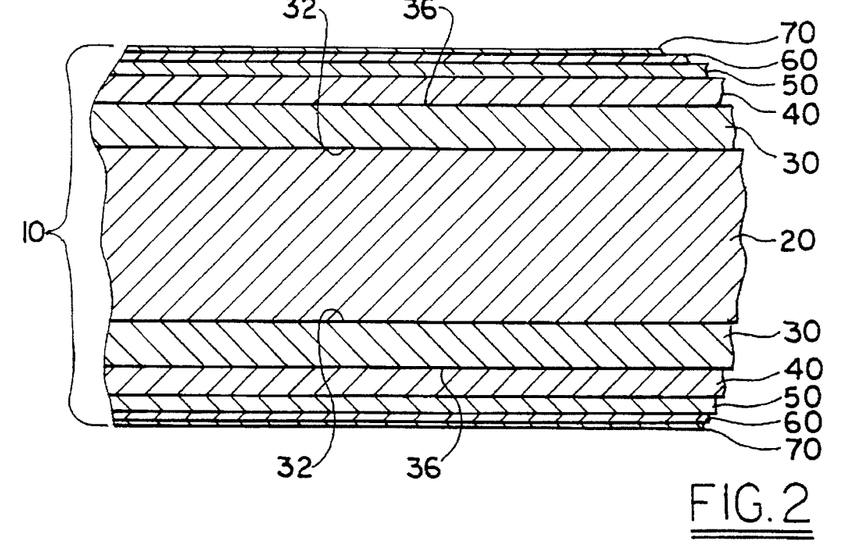
FIG. 2 is an enlarged section view of an embodiment of a magnetic storage medium according to the invention.

FIG. 2 shows an enlarged, cross-sectional view of a magnetic storage medium according to the invention. The magnetic storage medium 10 (generally) is comprised of a non-oxide ceramic core 20 which is coated, on at least one surface thereof, with a smoothing layer 30. The smoothing layer 30 has an inner surface 32 and an outer surface 36, with the inner surface being in contact with the non-oxide ceramic core. In preferred embodiments, the magnetic storage medium has an annular disk shape with two flat major surfaces, such as the shape shown in FIGS. 1A and B, with the smoothing layer 30 (and the other operative layers described hereinafter) being preferably coated on both of the flat surfaces.

Disposed on top of the smoothing layer 30 is a magnetic layer 50 which is of a material capable of magnetically storing data thereon. An optional transition layer 40 may be disposed such that it lies between the smoothing layer 30 and the magnetic layer 50. The transition layer is believed to promote bonding of the magnetic layer to the smoothing layer and, in some cases, may hinder mass transport from either the smoothing layer 30 or non-oxide core 20 to the magnetic layer 50. On top of the magnetic layer may be at least one optional protective layer, which for purposes of illustration, is shown in FIG. 2 as an carbon layer 60 and an overlying lubricant layer 70.

The above-described components are described in more detail hereinafter.

The non-oxide ceramic core may be of any non-oxide ceramic material which is non-reactive and chemically compatible with the amorphous metal used in the smoothing layer. Examples of suitable non-oxide ceramic materials are silicon carbide, silicon nitride, silicon, boron carbide, titanium diboride, and mixtures thereof. Applicant's copending U.S. application, filed concurrently herewith, concerns substrates and magnetic media based on an aluminum nitride ceramic core. Another preferred non-oxide ceramic is silicon carbide, which can be of the alpha- or beta-crystal types, or a mixture thereof. Of these silicon carbides, alpha-silicon carbide is more preferred due to the lower cost for its manufacture.

preparation of the above-described non-oxide ceramic materials is generally well known and such materials are available commercially. Preparation of preferred sintered silicon carbides is described in U.S. Pat. Nos. 4,312,954 and 4,179,299, the teachings of which are incorporated herein by reference. Such non-oxide ceramics can be formed by any conventional method, such as, forming a raw batch mixture comprising the desired ceramic in powder form and a sintering aid, forming the raw batch mixture into an unsintered green body, and then denisifying the green body by conventional pressureless sintering, reaction bonding, chemical vapor deposition, hot pressing, or melt processing methods. Before densification, the raw batch compositions can be formed into a green body by tape casting, dry-pressing, extrusion, or other known methods for making ceramic bodies and then densified to final form. A preferred method for forming the green body is tape casting, since it is believed that this method provides a densified ceramic surface that, in many instances, is sufficiently smooth so as to be directly coated with the smoothing layer without prior grinding or polishing.

Some examples of suitable non-oxide ceramics are pressureless sintered HEXOLOY® SA silicon carbide and HEXOLOY® ST silicon carbide/titanium diboride composites, both available commercially from The Carborundum Company in Niagara Falls, N.Y., U.S.A. Also suitable are hot pressed $B_4C$, and melt processed $TiB_2$.

After the ceramic is formed and densified, it can be machined, if necessary, into a desired final shape and the surfaces thereof polished. The surfaces may be polished by using commercially available grinding and lapping equipment, as described more fully in the following examples.

The non-oxide ceramic core may optionally contain minor amounts of other compounds which can affect the non-oxide ceramic surface quality and mechanical properties, such as fracture toughness, to improve machineability of the ceramic. Compounds which can be employed for these purposes are silicon, silicon-containing compounds like MoSi2 and TiSi2, aluminum, aluminum-containing compounds like AlN, boron nitride, carbon, and metal oxides. Typically, these compounds are added in an amount of up to about 5 weight percent.

The non-oxide ceramic core is suitably densified to at least about 90 percent of theoretical density. Preferably, the non-oxide ceramic is densified to at least about 93 percent of theoretical density and more preferably to at least about 96 percent. Percent theoretical density is a well-known parameter in the art and, for a given ceramic composition, it may be readily determined using the Law of Mixtures. In general, a high degree of densification is preferred, as the resulting ceramic will have a reduced amount of surface porosity. Preferably, the non-oxide ceramic has substantially no surface porosity, i.e., pits, greater than about 2 microns in diameter.

The non-oxide ceramic has at least one surface which contacts the smoothing layer described in detail hereinafter. Preferably, the non-oxide ceramic has a surface roughness of less than about 2000 Å Ra, and more preferably less than about 1000 Å Ra. Surface roughness can be measured by known optical or contact methods, such as by use of a stylus profilometer. Surface roughness (Ra) values reported herein are determined using a Dektak IIA profilometer available commercially from Sloan Technology Corporation of Santa Barbara, Calif., U.S.A. This profilometer is equipped with a 12.5 micron (μm) radius diamond stylus and uses a tracking force of 50 milligrams. The Dektak IIA profilometer can determine surface roughness in the range of from about 5 Å to about 100,000 Å.

If the layered substrate or magnetic storage medium prepared therefrom are to be in the form of a plate, hollow drum, or the preferred flat annular disk shape, the ceramic core may have a thickness which can vary widely, but it is preferred that the thickness be as small as possible due to weight and space considerations. On the other hand, the thickness must be sufficient for the non-oxide ceramic to retain its rigidity and shape in subsequent processing steps and during use. For the preferred annular disks, a preferred thickness is from about 0.005 to about 0.2 cm, and more preferably from about 0.01 to about 0.10 cm.

An important component of the layered substrate is the smoothing layer which coats the non-oxide ceramic core. It has been found that the above-described non-oxide ceramics, when coated with a non-magnetic, substantially amorphous metal, provide an extremely strong, tough, and smooth substrate upon which to place a magnetic layer or layers for preparation of magnetic storage media. As used herein, the term "substantially amorphous" means that the metal is at least about 50 percent (by weight) amorphous, preferably at least about 80 percent, and most preferably at least about 95 percent amorphous, as determined by x-ray diffraction analysis. The phrases "amorphous metal" or "amorphous metal alloy" refer to metal compositions which may comprise minor amounts of non-metallic elements.

Figure 3:
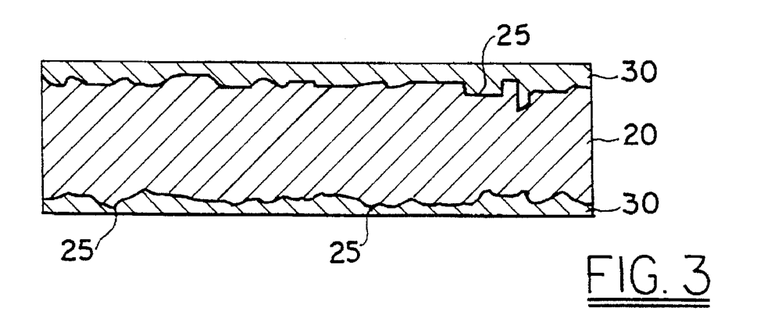
FIG. 3 is an enlarged section view of an embodiment of a layered substrate comprising a flat shaped non-oxide ceramic core with a smoothing layer coated on both sides thereof.

Referring now to FIG. 3, the non-oxide ceramic core 20 is shown coated with a smoothing layer 30 comprised of a substantially amorphous metal which can be polished to a very fine surface finish of less than about 100 Å Ra. As shown in the figure, surface irregularities 25 (shown generally) on the ceramic core, i.e., imperfections similar to the "peaks" and "valleys" previously discussed herein, are covered by deposition of the amorphous metal onto the non-oxide ceramic surface. The amorphous metal may then be polished to a fine surface finish of less than about 100, preferably less than about 25, more preferably less than about 10 Å Ra, which is then suitable for coating with the thin magnetic layer described hereinafter.

The smoothing layer is selected from substantially amorphous metals which are mechanically and thermally compatible with the non-oxide ceramic such that upon deposition, the metal is hard, electrically conductive, strongly adherent, resistant to chipping, and capable of being polished to the surface finish mentioned above.

Amorphous metals employed in the invention suitably have a coefficient of thermal expansion of from about 2 to about 7 ppm/°C., and preferably from about 3 to about 6 ppm/°C. Most preferably, the metal has a coefficient of thermal expansion within ±20 percent of that for the non-oxide ceramic employed, since this reduces stress caused by thermal contraction and expansion of the layered substrate.

The amorphous metal should also have a fracture toughness of greater than about 10 MPa·m$^{1/2}$, preferably greater than about 20 MPa·m$^{1/2}$, and more preferably greater than about 50 MPa·m$^{1/2}$ to impart the desired coating adhesion and substrate strength. The amorphous metal also preferably has an electrical resistivity of less than about 200 μΩ·cm to impart the desired anti-static electricity properties previously described.

The amorphous metal desirably has a crystallization temperature of at least about 400, preferably at least about 600, and more preferably at least about 750° C., as this helps maintain a smooth surface on the smoothing layer when the substrate is heated in subsequent processing steps. The amorphous metal should also remain substantially amorphous following exposure to such temperatures.

In preferred embodiments, the smoothing layer is comprised of an amorphous metal alloy corresponding to the formula:

$$M^1_a M^2_b X_c$$

where:

$M^1$ is selected from the group consisting of chromium, molybdenum, tungsten, and mixtures thereof;

$M^2$ is selected from the group consisting of titanium, zirconium, hafnium, tantalum, vanadium, niobium, iron, cobalt, nickel, ruthenium, rhodium, paladium, osmium, iridium, platinum, and mixtures thereof;

X is selected from the group consisting of nitrogen, aluminum, boron, silicon, phosphorous, germanium, arsenic, antimony, carbon, tin, and mixtures thereof;

a is from about 0.5 to about 0.95;

b is from 0 to about 0.3; and c is from greater than 0 to about 0.3.

As used herein, the subscripts a, b, and c refer to atomic fractions.

Some of the above-described alloys, and methods for preparing them, are described in U.S. Pat. Nos. 4,696,703; 4,701,226; and 4,851,296, the relevant teachings of which are incorporated herein by reference. Examples of such alloys are $Cr_{0.95}N_{0.05}$, $Cr_{0.90}N_{0.10}$, $Cr_{0.95}N_{0.03}B_{0.02}$, $Mo_{0.50}Cr_{0.40}N_{0.10}$, $Mo_{0.40}Cr_{0.40}N_{0.20}$, $Mo_{0.60}Cr_{0.30}B_{0.10}$, $Mo_{0.60}Cr_{0.20}B_{0.10}N_{0.10}$, $Cr_{0.80}Ta_{0.15}C_{0.05}$, $W_{0.40}Mo_{0.40}Al_{0.20}$, $W_{0.60}Ti_{0.20}Si_{0.20}$, $Mo_{0.70}Ni_{0.10}Ti_{0.05}B_{0.15}$, and $Cr_{0.60}Ta_{0.10}Si_{0.10}B_{0.10}N_{0.10}$. Of these metal alloys, those wherein $M^1$ is molybdenum, tungsten, or mixtures thereof and a is from about 0.75 to about 0.95 are more preferred, since such alloys have crystallization temperatures generally in excess of about 600° C.

The smoothing layer is deposited onto the non-oxide ceramic core to a thickness which is sufficient to cover surface irregularities thereon and that can be subsequently polished to a fine surface finish. Generally, a suitable thickness is from about 1 to about 50 microns, with about 20 microns or less being preferred to minimize cost.

The smoothing layer can be applied by any method which is suitable for deposition of thin films onto a substrate. Examples of such methods are electroplating, evaporation, ion sputtering, and DC magnetron sputtering, as well as those described in U.S. Pat. Nos. 4,696,703; 4,701,226; and 4,851,296, previously incorporated by reference. The smoothing layer is desirably deposited so as to be nearly defect-free and stress-free when applied to the ceramic.

A preferred method for depositing the smoothing layer is DC magnetron sputtering, wherein a thin film of such amorphous metal may be deposited using a target composed of the desired metals and atomic proportions thereof. DC magnetron sputtering is a known sputtering process wherein a magnetic field is oriented perpendicular to a DC electric field. Sputter targets can be obtained commercially from Cerac, Inc. of Milwaukee, Wis., U.S.A. Alternatively, a plurality of sputter targets can be used, each of which is composed of a desired metal, or metals, to be incorporated into the resulting smoothing layer. A desired atomic proportion of such metals can be obtained by manipulating the power input to each target during sputtering, as would be apparent to one skilled in the art.

If desired, the layered substrate previously described may be adapted into a magnetic storage medium by depositing thereon a magnetic layer which is of a material capable of magnetically storing data. The magnetic layer may be directly formed on top of the outer surface of the smoothing layer, but, preferably, an optional transition layer is first formed on the smoothing layer to improve bonding of the magnetic layer to the underlying substrate.

The transition layer preferably comprises a metal selected from chromium, vanadium, tantalum, molybdenum, and mixtures thereof. Most preferably, the transition layer is comprised of chromium due to its chemical compatibility with most materials used in forming magnetic layers. The transition layer suitably has a thickness which is sufficient to cover the coated substrate. Generally, a thickness of from about 2,000 to about 20,000 Å is adequate, preferably from about 5,000 to about 10,000 Å. The transition layer may also be formed by any of the deposition methods, as previously described, for depositing the amorphous metal.

Suitable materials which may be used to form the magnetic layer are known. Generally, any magnetic material or metal which is capable of magnetically storing data is suitable. Typically, the magnetic layer is cobalt, iron, or a mixture of the two, in which other elements are optionally added to improve performance, such as chromium, nickel, platinum, tantalum, boron, and silicon. The magnetic layer has a thickness of desirably from about 100 to about 2500 Å, and preferably from about 100 to about 500 Å. Methods to form the magnetic layer include DC magnetron sputtering, evaporation and chemical vapor deposition.

Optionally, the magnetic storage medium may have at least one protective layer which is coated on top of the magnetic layer to provide protection from contact with the recording or read-only head. Suitable materials for the protective layer are also known and include an amorphous inorganic oxide, such as that disclosed in U.S. Pat. No. 4,069,360, the relevant teachings of which are incorporated herein by reference. Also suitable are thin films of metals, such as rhodium, chromium, platinum, and ruthenium, as well as boron nitride, carbon, and silicon carbide. Carbon is presently widely employed as a protective material for conventional aluminum-NiP magnetic storage media and is desirable due to its non-magnetic characteristic and an ability to be readily sputtered onto a substrate.

A thin film of lubricant, such as DuPont 804 lubricant available from the E.I. DuPont de Nemours & Company of Wilmington, Del., U.S.A., may also be optionally coated on top of the materials previously mentioned as an additional protective layer. Such lubricants assist with reducing friction between the magnetic storage medium and the recording or read-only head.

The thickness of the above described protective layer, or layers, is generally less than about 1000 Å, and preferably less than about 500 Å.

Specific Embodiments of the Invention

The following examples are intended to illustrate the invention and should not be construed, by implication or otherwise, as limiting the scope of the appended claims.

EXAMPLES 1–8

Preparation of Ultra-Smooth Layered Substances

A. Preparation of Non-Oxide Ceramic Cores

A number of non-oxide ceramic core substrates measuring 3 centimeters (cm) long, 3 cm wide, and 0.10 cm thick are initially provided.

In Examples 1–4, the cores are machined from HEXOLOY® SA silicon carbide obtained from The Carborundum Company. In Examples 1 and 4, the silicon carbide employed is material which is formed into a green body by tape casting. In Example 2, the silicon carbide employed is formed into a green body by dry pressing. In Example 3, the silicon carbide is formed into a green body by extrusion.

In Example 5, a non-oxide ceramic core of KT-7S™ silicon carbide commercially available from The Carborundum Company is employed for the substrate. KT-7S silicon carbide is a reaction-bonded silicon carbide consisting of 11 weight percent silicon, with the balance being essentially silicon carbide.

In Example 6, a non-oxide ceramic core of HEXOLOY® ST silicon carbide composite material is used to provide the substrate and it is also commercially available from The Carborundum Company. The silicon carbide composite material contains approximately 17 weight percent titanium diboride, with the balance being essentially silicon carbide.

In Example 7, a non-oxide ceramic core of boron carbide is prepared by hot pressing boron carbide powder in an argon atmosphere at a pressure of 5 ksi and a temperature of 2000° C. for 4 hours. The resulting $B_4C$ ceramic is then machined into the above-described substrate.

In Example 8, a non-oxide ceramic core of HEXOLOY® SB silicon carbide composite material, also available commercially from The Carborundum Company, is used for the substrate. The composite consists of 20 weight percent $B_4C$, with the balance being essentially silicon carbide.

The surfaces of each substrate are first polished using a Planopol-V polisher available from Struers Company. The substrates are loaded onto the polisher and polished initially with a polishing disk using a slurry consisting of water and a diamond powder having an average particle size of 6 microns for 20 minutes. Thereafter, the substrates are polished for an additional 30 minutes using a slurry wherein the diamond powder has an average particle size of 1 micron. Finally, the substrates are polished for an additional 10 minutes with a slurry wherein the diamond powder has an average particle size of 0.1 micron. Between each of the above-described polishing steps, the substrates are cleaned with a detergent and rinsed with deionized water. After polishing, the substrates are cleaned again, rinsed a final time with deionized water, and allowed to dry in air.

Prior to coating them with a substantially amorphous metal smoothing layer, the surface roughness for each core is determined using the Dektak IIA profilometer previously described. The surface roughness determined for each core is listed in Table II hereinafter.

B. Coating the Ceramic Cores with Amorphous Metal Smoothing Layers

The ceramic cores are coated by DC magnetron sputtering with a smoothing layer of a non-magnetic, substantially amorphous metal. The equipment used to sputter the coatings consists of a vacuum chamber which has a base pressure of less than $5\times10^{-5}$ torr by use of a cryopump. The chamber is equipped with three sputter guns, each of which has a cathode available commercially as a SunSource Planar Magnetron Cathode from Materials Science Company in San Diego, Calif., U.S.A. A target of the metal or metals to be sputtered is attached to a cathode. The chamber is also equipped with a quartz lamp and a mechanical rotation means to which the substrates may be attached and rotated at an even rate above the cathodes. During use, argon gas is fed into the chamber and, in some examples as described hereinafter, nitrogen gas is fed with the argon to result in an amorphous metal coating which incorporates nitrogen. The pressure within the chamber is maintained within from $1\times10^{-3}$ to $7\times10^{-3}$ torr.

In each example, the substrate of interest is attached to the rotating means directly above the cathodes. The chamber is evacuated and the substrate heated to a temperature of 200° C. by use of the quartz lamp. Thereafter, the lamp is turned off. For each example, the targets, power input to each respective target, volume ratio of nitrogen to argon gas (if desired), and overall deposition rate appear in Table I.

TABLE I

| Sputtering Conditions for Examples 1–8 | | | |
|---|---|---|---|
| Example No. | Targets | Power Input (Watts/cm²) | $N_2$/Ar Vol. Ratio | Deposition Rate (μm/min) |
| 1 | $Cr_{0.5}Mo_{0.5}$ | 110 | 0.1 | 1.90 |
| 2 | Cr | 100 | 0.05 | 2.0 |
| 3 | Cr | 100 | 0.05 | 2.0 |
| 4 | $Cr_{0.5}Mo_{0.5}$ | 110 | 0.1 | 1.90 |
| 5 | Cr | 100 | 0.05 | 2.0 |
| 6 | $Cr_{0.5}Mo_{0.5}$ | 85 | 0.1 | 1.7 |
| 7 | $Mo_{0.6}Cr_{0.3}B_{0.1}$ | 50 | — | 1.4 |
| 8 | $Cr_{0.86}B_{0.14}$ $Ta_{0.50}Si_{0.50}$ | 100 20 | 0.05 | 1.3 |

The targets are obtained commercially from Cerac, Inc. of Milwaukee, Wis. The approximate composition of the resulting smoothing layer and its thickness for each example appears in Table II.

Each coated substrate is then polished to a very fine surface finish by using the Planopol-V polisher. The coated substrates are loaded onto the polisher and polished initially with a polishing disk using a slurry consisting of water and a diamond powder having an average particle size of 1 micron for 10 minutes. Thereafter, the substrates are polished for an additional 20 minutes with a slurry having a diamond powder of 0.1 micron in average size. Between the above-described polishing steps, the substrates are cleaned with a detergent and rinsed with deionized water. After polishing, the substrates are cleaned again, rinsed a final time with deionized water, and allowed to dry in air.

After polishing, the surface finish of each coated substrate is measured using the Dektak II profilometer previously described. The surface roughness determined for each example is listed in Table II.

In Examples 1–8, the interfacial fracture energy is observed to be larger than the fracture energy of the ceramic core, thereby indicating good adherence of the amorphous metal to the ceramic. The interfacial fracture energy is, in simplistic terms, essentially the amount of energy required to remove the amorphous metal from the surface of the ceramic core. Interfacial fracture energy is evaluated by applying a gradually increasing shear force to the amorphous metal coating and, at the point of failure, determining whether failure occurs within the amorphous metal coating, at the interface with the ceramic core, or within the ceramic itself. In each example, failure occurred within the ceramic core which suggests that the fracture energy of the amorphous metal coating is greater than that of the ceramic core. Thus, adhesion of the coating in each example is good.

The chamber is operated substantially in the same manner as previously described for Examples 1 and 2, except that the vacuum chamber is first heated to a temperature of 700° C. which is maintained for 10 minutes. Thereafter, the cathode having the chromium target is used to sputter a transition layer of chromium metal onto both substrates. The power input to the cathode is 10 watts/cm$^2$ for 20 minutes, which is sufficient to form a layer of chromium metal approximately 1 micron thick on both substrates. Sputtering is then discontinued.

Thereafter, the cathode having the cobalt-chromium alloy target is used to deposit a magnetic metal layer onto both substrates, the magnetic layer formed corresponding essentially to the composition of the target, i.e., $CO_{0.80}Cr_{0.10}Pt_{0.05}Ta_{0.05}$. The power input to the cathode is 15 watts/cm$^2$ for 30 seconds, which is sufficient to deposit a magnetic layer 200 Å thick. Sputtering is then discontinued.

The cathode having the HEXOLOY® SG90 silicon carbide target is then used to deposit a silicon carbide protective layer on top of the magnetic layer, the protective layer essentially corresponding to the composition of the target. The power input to the cathode is 10 watts/cm$^2$ for 10 seconds which is sufficient to deposit a layer having a thickness of 50 Å.

After deposition of the above-described layers, the resulting layered substrate is capable of being used as a magnetic storage medium.

The surface roughness of the resulting final products is then determined according to the procedure of Examples 1

TABLE II

Data For the Layered Substrates of Example 1–8

| Example No. | Ceramic Core | Surface Finish of Ceramic Core (Å) Ra | Coating Composition | Surface Finish of Coated Core (Å) Ra | Coating Thickness (μm) |
| --- | --- | --- | --- | --- | --- |
| 1 | SiC (tape cast) | 520 | $Mo_{0.40}Cr_{0.40}N_{0.20}$ | 18 | 10 |
| 2 | SiC (dry pressed) | 1875 | $Cr_{0.90}N_{0.10}$ | 23 | 12 |
| 3 | SiC (extruded) | 714 | $Cr_{0.90}N_{0.10}$ | 28 | 12 |
| 4 | SiC (tape cast) | 609 | $Cr_{0.40}Mo_{0.40}N_{0.20}$ | 22 | 23 |
| 5 | SiC/Si | 420 | $Cr_{0.90}N_{0.10}$ | 20 | 12 |
| 6 | SiC/TiB$_2$ | 735 | $Mo_{0.40}Cr_{0.40}N_{0.20}$ | 33 | 10 |
| 7 | B$_4$C | 600 | $Mo_{0.60}Cr_{0.30}B_{0.10}$ | 20 | 12 |
| 8 | SiC/B$_4$C (20 wt %) | 529 | $Cr_{0.60}Ta_{0.10}Si_{0.10}B_{0.10}N_{0.10}$ | 18 | 8 |

The results for Examples 1–8 illustrate that non-oxide ceramics can be incorporated into a layered substrate having an ultra-smooth surface finish which is necessary for preparing high density magnetic storage media.

EXAMPLES 9–10

Preparation of Magnetic Storage Media

The layered substrates prepared according to Examples 1 and 2 hereinabove are used to prepare magnetic storage media.

After polishing the amorphous metal surfaces of both substrates as in Examples 1 and 2 above, each substrate is again placed onto the rotating means within the vacuum chamber. The three cathodes are equipped respectively with a target of chromium, a target of an alloy consisting of $CO_{0.80}Cr_{0.10}Pt_{0.05}Ta_{0.05}$, and a target of HEXOLOY® SG-90 silicon carbide (with added minor amounts of graphite and boron therein) available from The Carborundum Company.

and 2. In Example 9, the surface roughness is 16 Å Ra, while for Example 10 the surface roughness is 22 Å Ra. In both examples, the surface roughness of the final products essentially corresponds to the surface roughness of the smoothing layer determined in Examples 1 and 2, thereby indicating that deposition of the additional layers does not substantially alter surface roughness.

Adhesion of the above-described multi-layered coating to the ceramic core is then evaluated by a "peel" technique. A wire is soldered to each of the above-described multi-layered substrates through use of a 0.1 mm by 0.1 mm pad of solder. The force required to peel the wire from the pad is then determined. In Examples 9 and 10, the force required to peel the wire from the substrate is determined to be at least 10 pounds (44.5N), thereby indicating that the coating is strongly adherent to the ceramic.

EXAMPLES 11–15

In Examples 11–15, surface defects of known depth are placed into a ceramic core and the core is thereafter coated with an amorphous metal smoothing layer. The resulting layered substrates are evaluated to determine the ability of the amorphous metal to fill the defects and improve the surface finish.

In Examples 11 and 12, the procedure of Example 1 is substantially repeated, except that before coating the ceramic with the amorphous metal, defects are placed into the surface of the ceramic by use of diamond tips of known depth. In Example 11 the depth of the resulting surface defect is 1.0 micron and in Example 12 the depth is 1.1 micron.

Thereafter, the smoothing layer of substantially amorphous $MO_{0.40}Cr_{0.40}N_{0.20}$ metal is deposited onto each ceramic core as in Example 1 to a thickness of 10 microns. The coated ceramics are then polished to a fine surface finish and the surface roughness determined as in Example 1. The surface roughness values are listed in Table III.

In Examples 13-15, the procedure of Example 2 is substantially repeated, except that defects of known depth are also placed into the surface of the ceramic cores. The depth of the surface defects in Examples 13-15 are 0.4 micron, 3.8 microns, and 4.6 microns, respectively.

Thereafter, a smoothing layer of substantially amorphous $Cr_{0.90}N_{0.10}$ metal is deposited onto the ceramic cores as in Example 2 to a thickness of 12 microns. The coated ceramics are then polished to a fine surface finish and the surface roughness is determined as in Example 2. The surface roughness values are also listed in Table III.

TABLE III

Data For Examples 11-15

| Example No. | Ceramic | Defect Depth (μm) | Coating | Surface Roughness After Coating (Å) Ra |
|---|---|---|---|---|
| 11 | SiC (tape cast) | 1.0 | $Mo_{0.40}Cr_{0.40}N_{0.20}$ | 14 |
| 12 | SiC (tape cast) | 1.1 | $Mo_{0.40}Cr_{0.40}N_{0.20}$ | 18 |
| 13 | SiC (dry press) | 0.4 | $Cr_{0.90}N_{0.10}$ | 24 |
| 14 | SiC (dry press) | 3.8 | $Cr_{0.90}N_{0.10}$ | 30 |
| 15 | SiC (dry press) | 4.6 | $Cr_{0.90}N_{0.10}$ | 20 |

Examples 11-5 illustrate that using an amorphous metal smoothing layer according to the invention is effective at removing significant surface defects from a non-oxide ceramic, thereby producing a layered substrate suitable for high density magnetic storage media.

Similar results are obtained from other embodiments of the invention as previously described herein.

What is claimed is:

1. A layered substrate capable of being adapted for use as a magnetic data storage medium, the substrate comprising:

a non-oxide ceramic core having a plurality of surfaces; and a smoothing layer with an inner surface contacting at least one surface of the ceramic core and an outer surface having a surface roughness of less than 100 Å Ra, the smoothing layer comprising a non-magnetic, substantially amorphous metal having a fracture toughness of at least 10 MPa·m$^{1/2}$;

an electrical conductivity or less than about 200 μΩ·cm;

a crystallization temperature of at least about 400° C.;

and a coefficient of thermal expansion o between about 2 to about 7 ppm/°C.; and wherein the amorphous metal is an alloy which corresponds to the formula:

$M^1_a M^2_b X_c$ wherein $M^1$ is selected from the group consisting of chromium, molybdenum, tungsten, and mixtures thereof;

$M^2$ is selected from the group consisting of titanium, zirconium, hafnium, tantalum, vanadium, niobium, iron, cobalt, nickel, ruthenium, rhodium, palladium, osmium, iridium, platinum, and mixtures thereof;

X is selected from the group consisting of nitrogen, aluminum, boron, silicon, phosphorous, germanium, arsenic, antimony, carbon, tin, and mixtures thereof;

a is from about 0.5 to about 0.95;

b is from 0 to about 0.3; and c is from greater than 0 to about 0.3, and a+b+c is 1.

2. The layered substrate of claim 1 wherein the outer surface of the smoothing layer has a surface roughness of less than about 25 Å Ra.

3. The layered substrate of claim 1 wherein the outer surface of the smoothing layer has a surface roughness of less than about 10 Å Ra.

4. The layered substrate of claim 1 wherein the smoothing layer has a thickness of from about 1 to about 20 microns.

5. The layered substrate of claim 1 wherein the metal has a fracture toughness of at least about 50 MPa·m$^{1/2}$.

6. The layered substrate of claim 1 wherein the non-oxide ceramic core is selected from the group consisting of silicon carbide, silicon, silicon nitride, boron carbide, titanium diboride, and mixtures thereof.

7. The layered substrate of claim 1 wherein the non-oxide ceramic core is silicon carbide.

8. The layered substrate of claim 7 wherein the silicon carbide originates from a ceramic green body formed by a tape-casting process.

9. The layered substrate of claim 7 wherein the silicon carbide consists essentially of alpha silicon carbide.

10. The layered substrate of claim 1 wherein the ceramic core is a material densified to at least about 96% of theoretical density.

11. the layered substrate of claim 1 wherein $M^1$ is selected from molybdenum, tungsten, and mixtures thereof and a is from about 0.75 to about 0.95.

12. A magnetic storage medium, comprising:

a non-oxide ceramic core having a plurality of surfaces;

a magnetic layer capable of storing data and having an inner surface and an outer surface; and a smoothing layer with an inner surface contacting at least one surface of the ceramic core and an outer surface having a surface roughness of less than 100 Å Ra, the smoothing layer disposed between the ceramic core and the magnetic layer, the smoothing layer comprising a non-magnetic, substantially amorphous metal having a fracture toughness of at least 10 MPa·m$^{1/2}$; an electrical conductivity of less than about 200 μΩ·cm; a crystallization temperature of at least about 400° C.; and a coefficient of thermal expansion of between about 2 to about 7 ppm/°C.; and wherein the amorphous metal is an alloy which corresponds to the formula:

$M^1_a M^2_b X_c$ wherein $M^1$ is selected from the group consisting of chromium, molybdenum, tungsten, and mixtures thereof;

$M^2$ is selected from the group consisting of titanium, zirconium, hafnium, tantalum, vanadium, niobium, iron, cobalt, nickel, ruthenium, rhodium, palladium, osmium, iridium, platinum, and mixtures thereof;

X is selected from the group consisting of nitrogen, aluminum, boron, silicon, phosphorous, germanium, arsenic, antimony, carbon, tin, and mixtures thereof;

a is from about 0.5 to about 0.95;

b is from 0 to about 0.3; and c is from greater than 0 to about 0.3, and a+b+c is 1.

13. The magnetic storage medium of claim 12 wherein the outer surface of the smoothing layer has a surface roughness of less than about 25 Å Ra.

14. The magnetic storage medium of claim 12 wherein the outer surface of the smoothing layer has a surface roughness of less than about 10 Å Ra.

15. The magnetic storage medium of claim 12 wherein the amorphous metal has a fracture toughness of at least about 50 Mpa·m$^{1/2}$.

16. The magnetic storage medium of claim 12 wherein the magnetic layer is an alloy comprised of metals selected from the group consisting of cobalt, iron, chromium, platinum, nickel, tantalum, boron and mixtures thereof.

17. The magnetic storage medium of claim 12 further comprising a transition layer of a metal selected from the group consisting of chromium, vanadium, niobium, tantalum, and molybdenum which is disposed between the smoothing layer and the magnetic layer, the transition layer contacting the outer surface of the smoothing layer and the inner surface of the magnetic layer.

18. The magnetic storage medium of claim 17 wherein the transition layer is chromium.

19. The magnetic storage medium of claim 12 further comprising at least one protective layer coating the outer surface of the magnetic layer.

20. The magnetic storage medium of claim 12 wherein the non-oxide ceramic core is selected from the group consisting of silicon carbide, silicon, silicon nitride, boron carbide, titanium diboride, and mixtures thereof.

21. The magnetic storage medium of claim 12 wherein the non-oxide ceramic core is silicon carbide.

22. The magnetic storage medium of claim 22 wherein the silicon carbide originates from a ceramic green body formed by a tape-casting process.

23. The magnetic storage medium of claim 12 wherein the ceramic core is a material densified to at least about 96% of theoretical density.

24. The magnetic storage medium of claim 12 wherein $M^1$ is selected from molybdenum, tungsten, and mixtures thereof and a is from about 0.75 to about 0.95.

25. The magnetic storage medium of claim 12 wherein the ceramic core comprises a disk having a thickness of from about 0.01 to about 0.1 cm with two essentially flat surfaces thereon.

26. The magnetic storage medium of claim 25 wherein the smoothing layer contacts both flat surfaces.

27. A process for preparing a layered substrate capable of being adapted into a magnetic storage medium, the processing comprising:

providing a non-oxide ceramic core having a plurality of surfaces and having a density of at least 90% of theoretical density;

coating at least one surface of the ceramic core with a smoothing layer comprised of a non-magnetic, substantially amorphous metal having a fracture toughness of at least 10 MPa·m$^{1/2}$; an electrical conductivity of less than about 200 µΩ·cm; a crystallization temperature of at least about 400° C.; and a coefficient of thermal expansion of between about 2 to about 7 ppm/°C.; and wherein the amorphous metal is an alloy which corresponds to the formula:

$$M^1{}_a M^2{}_b X_c$$

wherein $M^1$ is selected from the group consisting of chromium, molybdenum, tungsten, and mixtures thereof;

$M^2$ is selected from the group consisting of titanium, zirconium, hafnium, tantalum, vanadium, niobium, iron, cobalt, nickel, ruthenium, rhodium, palladium, osmium, iridium, platinum, and mixtures thereof;

X is selected from the group consisting of nitrogen, aluminum, boron, silicon, phosphorous, germanium, arsenic, antimony, carbon, tin, and mixtures thereof;

a is from about 0.5 to about 0.95;

b is from 0 to about 0.3; and c is from greater than 0 to about 0.3, and a+b+c is 1; and polishing the smoothing layer to a surface roughness of less than 100 Å Ra.

28. The process of claim 27 wherein the non-oxide ceramic core is selected from the group consisting of silicon carbide, silicon, silicon nitride, boron carbide, titanium diboride, and mixtures thereof.

29. The process of claim 28 further comprising forming the non-oxide ceramic by pressureless sintering, reaction bonding, chemical vapor deposition, hot pressing, or melt processing.

30. The process of claim 28 further comprising forming the non-oxide ceramic by pressureless sintering.

31. The process of claim 30 further comprising forming an intermediate ceramic green body by tape casting, dry pressing, or extruding a raw batch mixture comprising the non-oxide ceramic in powder form prior to sintering.

32. The process of claim 27 further comprising polishing the surfaces of the non-oxide ceramic core to a surface roughness of less than about 2000 Å Ra prior to coating the core with the smoothing layer.

33. The process of claim 27 wherein the amorphous metal is coated onto the non-oxide ceramic by electroplating, evaporation, ion sputtering, or DC Magnetron sputtering.

34. The process of claim 27 wherein the amorphous metal is coated onto the non-oxide ceramic by DC magnetron sputtering.

35. The process of claim 27 wherein the smoothing layer is polished to a surface roughness of less than about 25 Å Ra.

36. The process of claim 27 wherein the smoothing layer is polished to a surface roughness of less than about 10 Å Ra.

37. The process of claim 27 wherein $M^1$ is selected from molybdenum, tungsten, and mixtures thereof and a is from about 0.75 to about 0.95.

38. A process for preparing a magnetic storage medium comprising:

providing a non-oxide ceramic core having plurality of surfaces and having a density of at least 90% of theoretical density;

coating at least one surface of the ceramic core with a smoothing layer comprised of a non-magnetic, substantially amorphous metal having a fracture toughness of at least 10 MPa·m$^{1/2}$; an electrical conductivity of less than about 200 µΩ·cm; a crystallization temperature of at least about 400° C.; and a coefficient of thermal expansion of between about 2 to about 7 ppm/C.°; and wherein the amorphous metal is an alloy which corresponds to the formula:

$$M^1_a M^2_b X_c$$

wherein

M$^1$ is selected from the group consisting of chromium, molybdenum, tungsten, and mixtures thereof;

M$^2$ is selected from the group consisting of titanium, zirconium, hafnium, tantalum, vanadium, niobium, iron, cobalt, nickel, ruthenium, rhodium, palladium, osmium, iridium, platinum, and mixtures thereof;

X is selected from the group consisting of nitrogen, aluminum, boron, silicon, phosphorous, germanium, arsenic, antimony, carbon, tin, and mixtures thereof;

a is from about 0.5 to about 0.95;

b is from 0 to about 0.3; and c is from greater than 0 to about 0.3, and a+b+c is 1; and polishing the smoothing layer to a surface roughness of less than 100 Å Ra; and coating the smoothing layer with a magnetic layer comprised of a material capable of magnetically storing data thereon.

39. The process of claim 38 wherein the non-oxide ceramic core is selected from the group consisting of silicon carbide, silicon nitride, boron carbide, titanium diboride, and mixtures thereof.

40. The process of claim 39 further comprising forming the non-oxide ceramic by pressureless sintering, reaction bonding, chemical vapor deposition, hot pressing, or melt processing.

41. The process of claim 39 further comprising forming the non-oxide ceramic by pressureless sintering.

42. The process of claim 41 further comprising forming an intermediate ceramic green body by tape casting, dry pressing, or extruding a raw batch mixture comprising the non-oxide ceramic in powder form prior to sintering.

43. The process of claim 38 further comprising polishing the surfaces of the non-oxide ceramic core to a surface roughness of less than about 2000 Å Ra prior to coating the core with the smoothing layer.

44. The process of claim 38 wherein the amorphous metal is coated onto the non-oxide ceramic by electroplating, evaporation, ion sputtering, or DC magnetron sputtering.

45. The process of claim 38 wherein the amorphous metal is coated onto the non-oxide ceramic by DC magnetron sputtering.

46. The process of claim 38 wherein the smoothing layer is polished to a surface roughness of less than about 25 Å Ra.

47. The process of claim 38 wherein the smoothing layer is polished to a surface roughness of less than about 10 Å Ra.

48. The process of claim 38 wherein M$^1$ is selected from molybdenum, tungsten, and mixtures thereof and a is from about 0.75 to about 0.95.

49. The process of claim 38 wherein the magnetic layer is an alloy comprised of metals selected from the group consisting of cobalt, iron, chromium, platinum, nickel, tantalum, boron, and mixtures thereof.

50. The process of claim 38 wherein the magnetic layer is coated onto the smoothing layer by DC magnetron sputtering, evaporation, or chemical vapor deposition.

* * * * *